United States Patent [19]

Grare et al.

[11] Patent Number: 4,791,816
[45] Date of Patent: Dec. 20, 1988

[54] DEVICE FOR DETERMINING WHEN A THREADED TUBE JOINT WITH SCREW LIMITING STOP IS PROPERLY MADE UP

[75] Inventors: Didier Grare; Hervé Salkin, both of Aulnoye-Aymeries, France

[73] Assignee: Vallourec, Paris, France

[21] Appl. No.: 90,230

[22] Filed: Aug. 27, 1987

Related U.S. Application Data

[62] Division of Ser. No. 785,397, Oct. 8, 1985, Pat. No. 4,700,576.

[30] Foreign Application Priority Data

Oct. 8, 1984 [FR] France .................. 84 15403

[51] Int. Cl.$^4$ .................................. G01B 7/18
[52] U.S. Cl. ........................... 73/761; 73/855; 73/862.21
[58] Field of Search ............. 73/761, 855, 862.21; 338/2, 6

[56] References Cited

U.S. PATENT DOCUMENTS

| | | | |
|---|---|---|---|
| 2,568,940 | 9/1951 | Wolf | 338/2 X |
| 3,791,205 | 2/1974 | Hooker | 73/782 X |
| 4,023,402 | 5/1977 | Watanabe | 73/855 |
| 4,573,359 | 3/1986 | Carstensen | 73/761 |

*Primary Examiner*—Charles A. Ruehl
*Attorney, Agent, or Firm*—Arnold, White & Durkee

[57] ABSTRACT

A device for determining when a threaded joint for steel tubes having a male element (1) with external threads (3) with a screw limiting stop (5), and a female element (2) with corresponding internal threads (4) and a corresponding screw limiting stop (6) is properly made up is provided. The device comprises a strain gauge (12) and means (10, 11) for applying said gauge on the external surface of the female element (2) such that the gauge can measure superficial deformations of the female element (2) in the longitudinal direction along one of the generatrix of the female element.

3 Claims, 5 Drawing Sheets

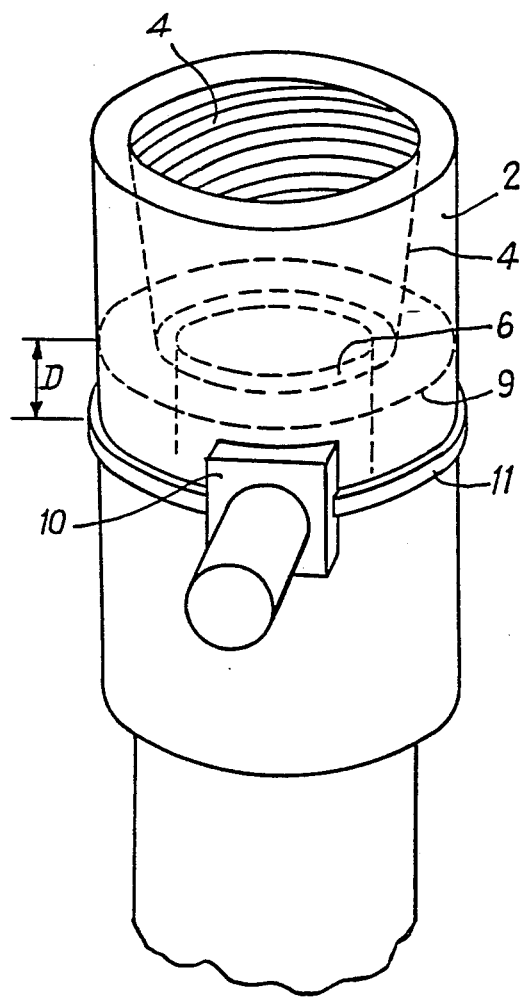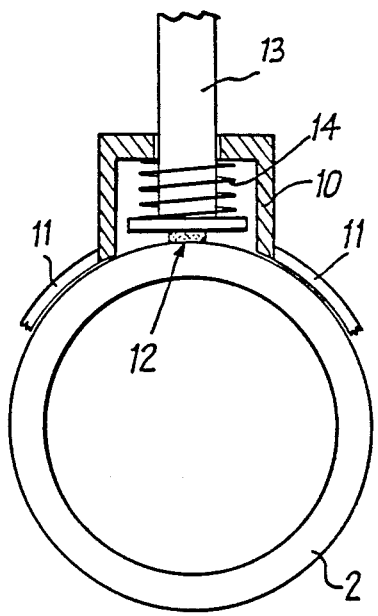

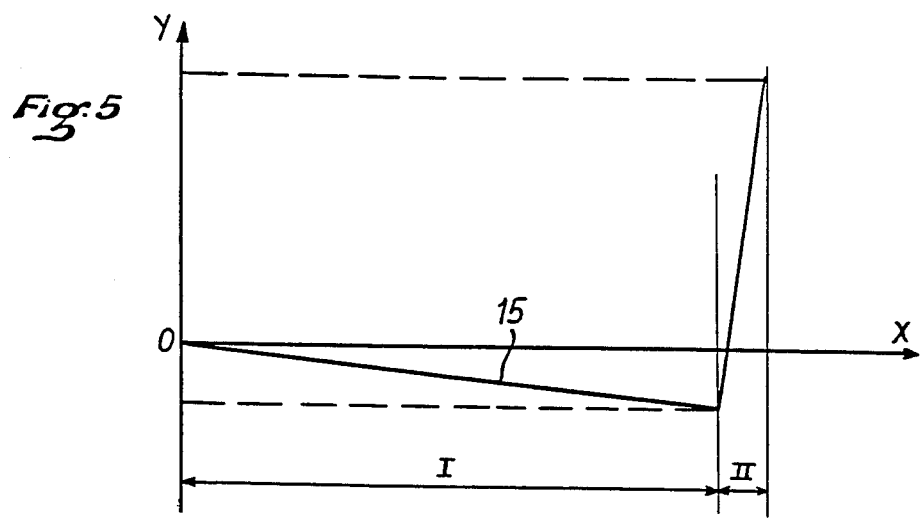
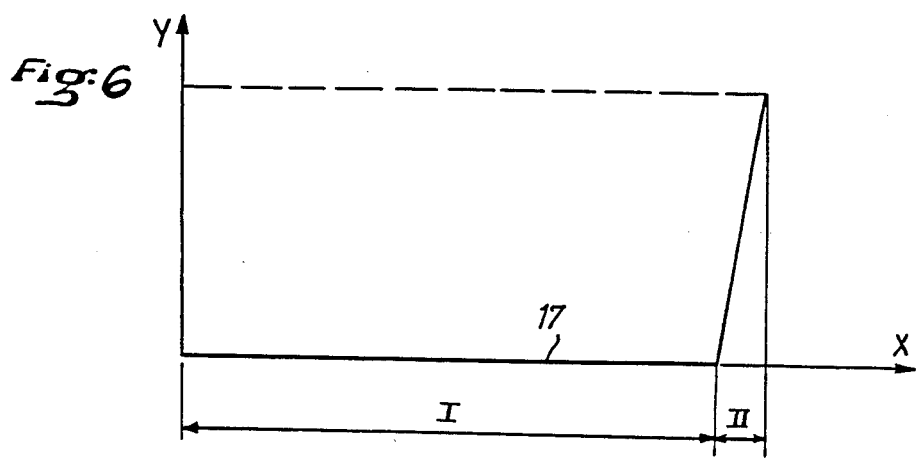

DEVICE FOR DETERMINING WHEN A THREADED TUBE JOINT WITH SCREW LIMITING STOP IS PROPERLY MADE UP

This is a division of application Ser. No. 785,397, filed Oct. 8, 1985, now Pat. No. 4,700,576.

BACKGROUND OF THE INVENTION

The present invention has as its object a process and a device for executing the screwing of threaded joints for steel tubes, equipped with a stop which can be used, in particular, in the petroleum industry.

It is known that threaded joints for tubes which connect, in an impervious and detachable fashion, sections of tubes which are placed end to end to make columns are currently used in the petroleum industry.

Such joints have male and female threads which are most generally tapered (but may occasionally be cylindrical), as well as impervious surfaces which come into contact during screwing down of the joint, and in most cases, screwing limit stops, the purpose of which is to suddenly increase the screwing torque so as to immobilize the two elements of the joint in a predetermined position.

Acccording to the state of the art, the screwing of joints in the workplace is carried out by connecting one of the elements of the joints with the other by screwing torque which is located within a domain predetermined by the joint manufacturer.

Thus, this operating method does not provide total satisfaction because, for a given screwing torque the conditions of tightening may vary to a large extent from one joint to another. In fact, due to manufacturing tolerances, resulting especially from differences in diameter of the male and female threads, as well as shifts in position of the screwing limit stops relative to the threads, the torque which is required to insure, for example, the fitting of tapered threads until the surfaces of the screwing limit stops come into contact, may vary in significant proportions, and the torque subsequently applied for tightening the screwing limit stops varies in the same fashion, but in the opposite direction. In addition, the greases used for the mounting of joints do not always have the same characteristics, which also results in a variation in the torque absorbed by the fitting in the threading.

Under these conditions, it is understood that joints reputed to be identical and screwed with the same tightening torque do not present the same conditions of operational reliability, in which a more or less large total screwing torque is absorbed by the fitting of the threads and/or by the tightening of the screwing limit stops.

SUMMARY OF INVENTION

The present invention concerns a new process and a new device allowing a predetermined torque to be applied to the joint after the screwing limit stops come into contact, which insures that all the threaded joints in this way present identical assembly and imperviousness characteristics.

The present invention has as its object a process for executing the screwing of a joint threaded for a steel tube intended especially for the petroleum industry, of a type having an external male thread and an internal female thread, as well as at least a pair of screwing limit stops located inside the female element, characterized by the fact that before proceeding with the screwing of the joint, a strain gauge which allows the instantaneous measurement of longitudinal deformations of the external surface along the line of the female element is applied to the external surface of the female element at a certain distance from the plane of the screwing limit stop and of the side of said plane which is opposite the threads, and that the screwing down of the joint is carried out until the indication provided by the strain gauge corresponds to an increase in a predetermined value of the surface of the female element along said line at he level of the gauge.

In the current state of the art, strain gauges are known which measure the deformation in the surface of the metal by simply being applied by pressure against said surface, this pressure suffices to apply to the gauge the deformations undergone by the surface of the metal.

During the execution of the process as defined above, it is first observed, in the case of a tapered thread, that a slight longitudinal compression of the metal at the surface of the female element occurs until the screwing limit stop of the male element comes into contact with the screwing limit stop of the female element. At this time, the screwing limit stop of the female element is subjected to a rotating torque which tends to increase the diameter of the female element beyond the plane of said stop by causing a longitudinal extension of the metal on the external surface along the line of the female element. It is this extension which the gauge measures, its maximal value corresponding to the tightening torque which must be applied to the stop of the joint.

In conformance with the invention, in the case where joints having tapered threading are used, it is also advantageous to insure that the longitudinal deformation of compression, which is measured by the strain gauge, does not exceed a predetermined value, such that it is insured that it does not exercise an excessive degree of torque at the level of the thread before contact with the screwing limit stops.

In the case where the process is applied to a joint having cylindrical threading, no deformation in the surface of the female element occurs before the screwing limit stops come into contact, such that during this entire period, the strain gauge does not provide any indication. In contrast, as soon as the screwing limit stops come into contact, a progressive longitudinal extension of the surface of the female element occurs which is visible due to the strain gauge.

In conformance with the invention, the strain gauge is preferentially placed in the vicinity of the female element which undergoes the maximum longitudinal extension, for example, at 7 mm from the plane of the screwing limit stop.

The present invention also has as its object a device for the execution of the process described above, and this device is characterized by the fact that it combines means for applying a strain gauge at a determined place on the external surface of the female element of a joint where screwing is executed, and the means, for example, of the type known for measuring longitudinal deformations of said surface, allowing the screwing of the joint to be interrupted when the strain gauge shows a deformation in the longitudinal extension of the surface of the metal of the female element which is at least equal to a predetermined value.

In accordance with the invention, it is advantageous to attach to the device means which allow a provision for the longitudinal contraction deformation of the surface of the female element which precedes the extension, in the case of tapered threading, which does not exceed a predetermined value, before the screwing limit stops come into contact.

With the goal of better understanding the invention, we will now describe, for illustrative purposes, and without any limiting characteristics, several modes of execution taken as example and represented in the appended diagrams.

BRIEF DESCRIPTION OF THE DRAWINGS

In these diagrams:

FIG. 3 is a schematic perspective view of a device in accordance with the invention, FIG. 4 is a schematic cross-sectional view of the device which applies the strain gauge to the tube, FIG. 5 is a view representing the theoretical development of longitudinal deformations in the surface of the female element of the joint according to FIGS. 1 and 2, FIG. 6 represents the theoretical longitudinal deformations of the surface of the female element of a joint having cylindrical threading and internal screwing limit stops and, FIG. 7 represents actual curves of the torque and deformations of the external surface of the female element actually recorded in a joint of the type represented in FIGS. 1 and 2.

DETAILED DESCRIPTION OF SPECIFIC EMBODIMENTS

Figure 1:
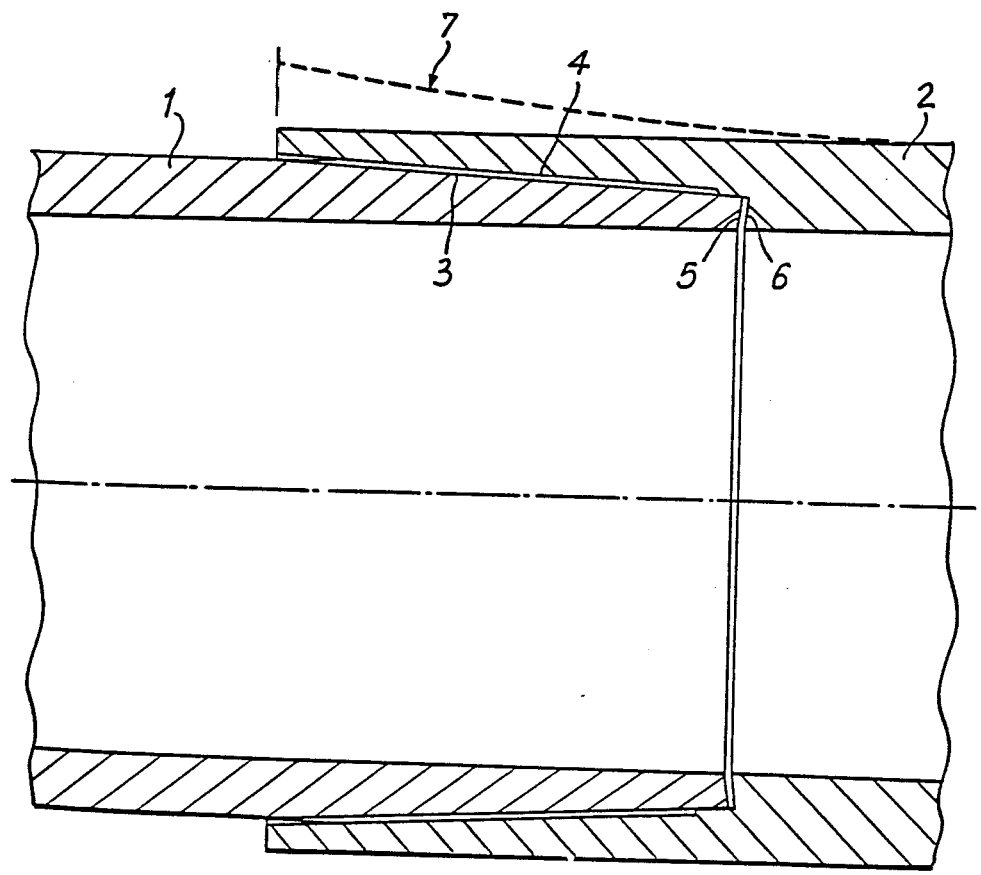
FIG. 1 is a schematic cross section of a joint having tapered threading and screwing limit stops within the female element before the latter comes into contact.

In FIG. 1, there is a schematic cross-sectional representation of a tubular steel joint designed for the petroleum industry which has a male element 1 and a female element 2. This female element 2 may be composed of a sleeve which is threaded at its right extremity as well as at its left extremity or alternatively at the machined extremity of a section of the tube.

The male element 1 has an external tapered thread 3, whereas the female element 2 has an internal tapered thread 4 of the corresponding shape. The male element 1 has a screwing limit stop 5 which is to be applied against the screwing limit stop 6 of the female element 2.

Because of the fact that the male element 1 at the level of the thread 3 has a diameter greater than the internal diameter of the thread 4 of the female element 2, and, as necessary, as the male element 1 is screwed into the female element 2 (and this is done until the surfaces 5 and 6 come into contact), an enlargement in the diameter of the female element 2 occurs, which is represented by the dashed line 7 in FIG. 1.

It is obvious that the deformations represented by curve 7 have been greatly exaggerated so as to render them visible in the diagram.

Observe in FIG. 1 that the deformation (e.g., the increase in diameter of the female element) extends toward the right beyond the plane of the screwing limit stop 6.

This flared deformation of the female element is manifested by a longitudinal contraction of the external surface of the female element (in the direction of a line) and by a transversal extension of this same external surface (in the direction perpendicular to the lines).

Figure 2:
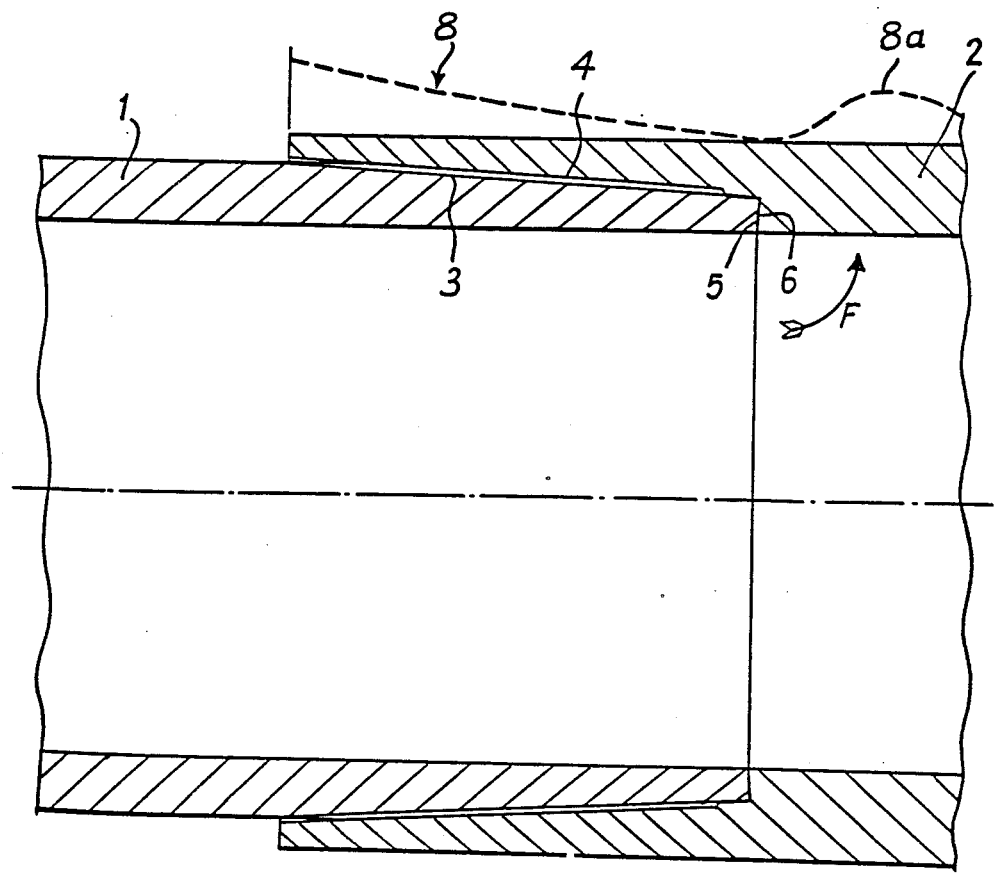
FIG. 2 is a cross section corresponding to FIG. 1 at the moment when the joint is totally tightened.

In FIG. 2, the joint of FIG. 1, has been represented after complete screwing down of the joint, i.e., after a tightening torque has been applied to the joint beyond the time where the stops 5 and 6 have come into contact with each other.

The dashed line of curve 8 in FIG. 2 represents the deformations which the external surface of the female element 2 undergo in this state.

Observe that in the portion of curve 8 which is located to the left of the plane of the screwing limit stop 6, the development of the deformations is essentially the same as in FIG. 1.

In contrast, to the right of the plane of the screwing limit stop 6, observe that a hump-shaped deformation 8a is caused by the fact that the extremity of the male element which pushes on the stop 6 has a tendency to cause the female element to rotate in the direction of the arrow F.

At the level of this hump 8a of curve 8, the surface of the female element undergoes a longitudinal extension as well as a transversal extension.

In conformance with the present invention, the measurement of the longitudinal deformations of the surface of the female element made with a strain gauge applied to the surface of the female element is used to determine the time at which the tightening of the joint must be stopped.

The device which allows the detection of superficial longitudinal deformations in the external surface of the female element has been schematically represented in a perspective view in FIG. 3.

In FIG. 3 is seen the female element 2 which is composed of a sleeve and which has thread 4 inside of which the extremity of the male element 1 must be engaged. We have also represented with a dashed line the screwing limit stop 6 as well as the trace 9 of the plane of the screwing limit stop 6 on the external surface of the female element 2.

The strain gauge is applied to the external surface of the female element 2 by means of the device 10 which is attached to the female element by a strap 11 which is schematically represented.

We can see that the strain gauge is placed at a distance D from the plane 9 of the screwing limit stop 6 of the side opposite to that where the threads 4 of the female element are found.

In FIG. 4, there is a schematic representation of the manner in which the strain gauge 12 is applied to the external surface of the female element 2 by being attached to a part 13 which slides within the block 10 attached to the tube by the strap 11 and is constantly pushed away by the return spring 14. The strain gauge 12 is oriented to measure longitudinal deformations (i.e., in a direction parallel to the axis of the tube).

It is understood that FIGS. 3 and 4 are only schematic and that the strain gauge 12 may be applied in different ways to the female element.

In particular, this strain gauge 12 may be integrated with the clamping jaws which hold the female element during the screwing down of the male element which is thereby driven in rotation.

Figure 7:
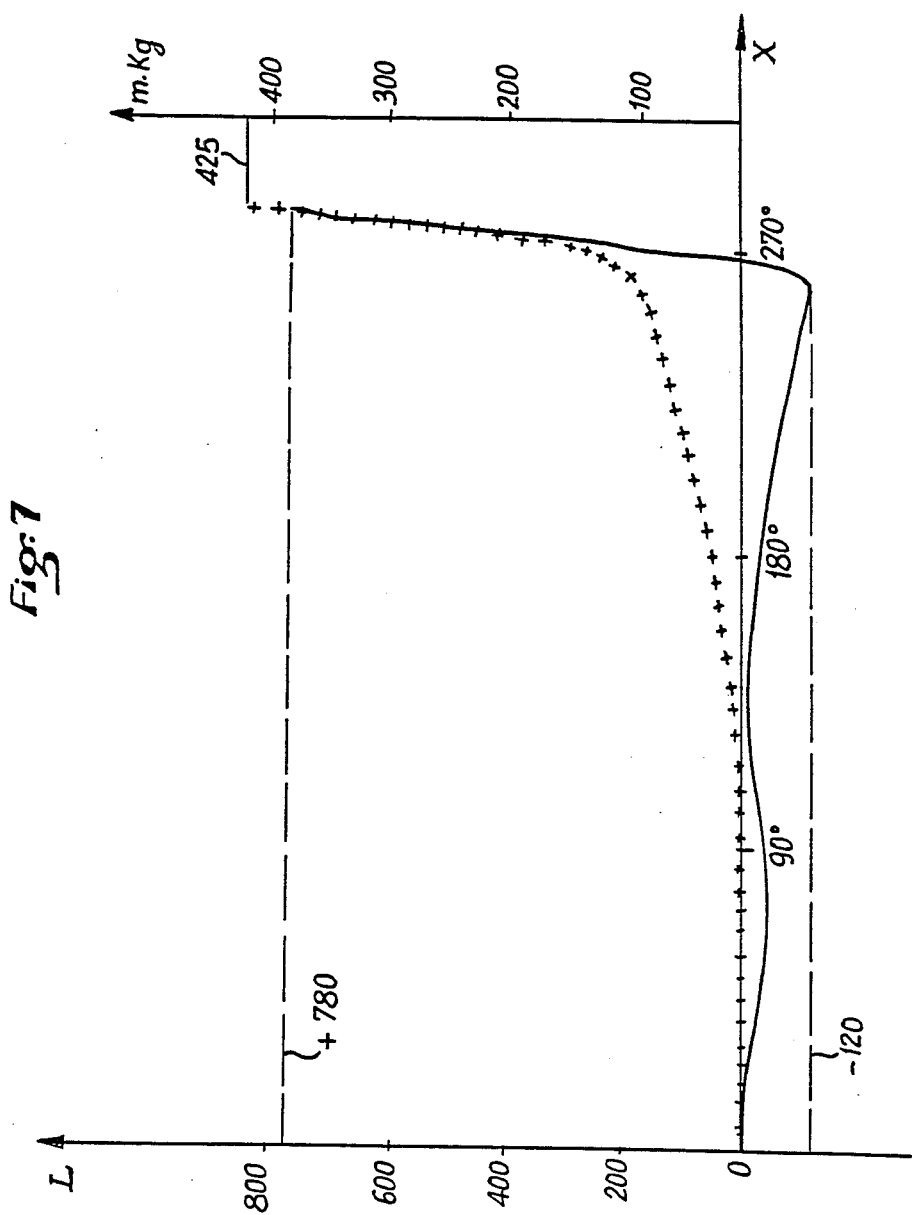

In FIGS. 5 through 7 the angle of rotation exerted against the male element and female element is represented on the abscissa X, and on the ordinate Y, the degree of longitudinal deformations of the external surface of the female element during screwing down is represented.

FIG. 5 represents the theoretical development of these deformations measured by the strain gauge in the direction of the lines.

In curve 15, we can see that the deformations of the external surface of the female element have a descending portion I which corresponds to the period during which the male element is driven into the female element,, thus resulting in the flared deformation of the external surface of the latter, which produces a longitudinal contraction of the external surface of the female element, whereas in portion II of the curve 15, which corresponds to the period which follows the contact of the screwing limit stops, the hump 8a of the curve 8 of FIG. 2 is progressively produced by causing a longitudinal extension of the external surface of the female element 2.

In FIG. 6, the curve of the superficial longitudinal deformations of the female element, in the case of a joint having a cylindrical thread and screwing limit stops, in which the deformations are measured at a certain distance from the screwing limit stop on the side which is opposite the threading, is represented.

Note that during the portion of the screwing which leads to the contact of the screwing limit stops, no deformation of the surface of the female element occurs because of the absence of fitting in the threads, whereas in the following portion 11 of the curve, a longitudinal extension of the surface of the female element occurs, as is the case in FIG. 5.

In FIG. 7, the deformations of the external surface of the female element of an actual joint are represented along with the tightening torque.

As in the case of FIGS. 5 and 6, we have represented the relative rotation of the male element relative to the female element in degrees on the abscissa X, and on the ordinate axis, on one hand the m.kg tightening torque applied, and on the other hand, the degree of longitudinal deformations L measured in mm $\times 10^{-6}$/mm (microdeformations) in the direction of the lines on the external surface of the female element.

This curve corresponds to the tightening of a commercial joint which is free in ½ inch tubing, 9.2 pounds per foot and which is made with grade 80 VC13 grade steel. The longitudinal strain gauges placed 7 mm from the plane of the screwing limit stop on the side opposite the threads.

FIG. 7, observe that the screwing torque, which is represented by the crosses slightly increases then increases more markedly up to 100 m/kg, at which time the impervious surfaces, then the screwing limit stops enter into contact (angle of rotation, 270°) to reach a value of 425 m. kg.

During the entire period of the slow and moderate increase in the torque, the external surface of the female element undergoes a contraction which corresponds to zone I of FIG. 5, then a sudden extension which increases at the same time as the torque (zone II of FIG. 5).

In the present case, the undulations in compression of zone I are explained by the machining tolerances at the level of the thread. The contraction reaches a minimum of −120 at the same time that the impervious surfaces, then the screwing limit stops come into contact (260°) to increase to a maximum extension of +780.

Thus it is seen that, in accordance with the invention, by stopping the screwing down of the joint at an extension value of +780, the correct torque applied to the joint is insured starting from the time that the screwing limit stops come into contact.

The time at which the algebraic sum of the electric signals representing on one hand, the torque and, on the other hand, the longitudinal deformation of the female element, exceed a predetermined low value which corresponds to the opposition of the stops can be used to apply an additional given increment of predetermined tightening or rotating torque, for example.

Nevertheless, by insuring that the minimal value of compression is less than a given value (for example, 200) it is certain that the fitting at the level of the threads is not excessive.

It can be seen that the process and the device in accordance with the invention allow the monitoring correct screwing to be executed in a simple and economical manner, which is a guarantee of the smooth operation of the joint, i.e., of its behavior and imperviousness.

It is understood that the methods for execution which are described above are not limiting in character and may undergo any desirable modifications without departing from the framework of the invention.

What is claimed is:

1. A device for determining when a threaded joint for steel tubes having a male element with external threads and a screw limiting stop and a female element with corresponding internal threads and a corresponding screw limiting stop is properly made up, said device comprising a strain gauge and means for applying said gauge on the external surface of said female element beyond said screw limiting stop in the direction of the middle of the tube section comprising the female element, the gauge measuring longitudinal deformations of the surface of said female element.

2. A device for determining when a threaded joint for steel tubes having a male element with external threads and a screw limiting stop and a female element with corresponding internal threads and a corresponding screw limiting stop is properly made up, said device comprising a strain gauge and means for applying said gauge on the external surface of said female element beyond said screw limiting stop in the direction of the middle of the tube section comprising the female element, the gauge measuring longitudinal deformations of extension of the surface of said female element.

3. A device for determining when a threaded joint for steel tubes having a male element with external threads and a screw limiting stop and female element with corresponding internal threads and a corresponding screw limiting stop is properly made up, said device comprising a strain gauge and means for applying said gauge on the external surface of said female element beyond said screw limiting stop in the direction of the middle of the tube section comprising the female element, the gauge measuring longitudinal deformations of contraction of the surface of said female element.

* * * * *